Figure 1:
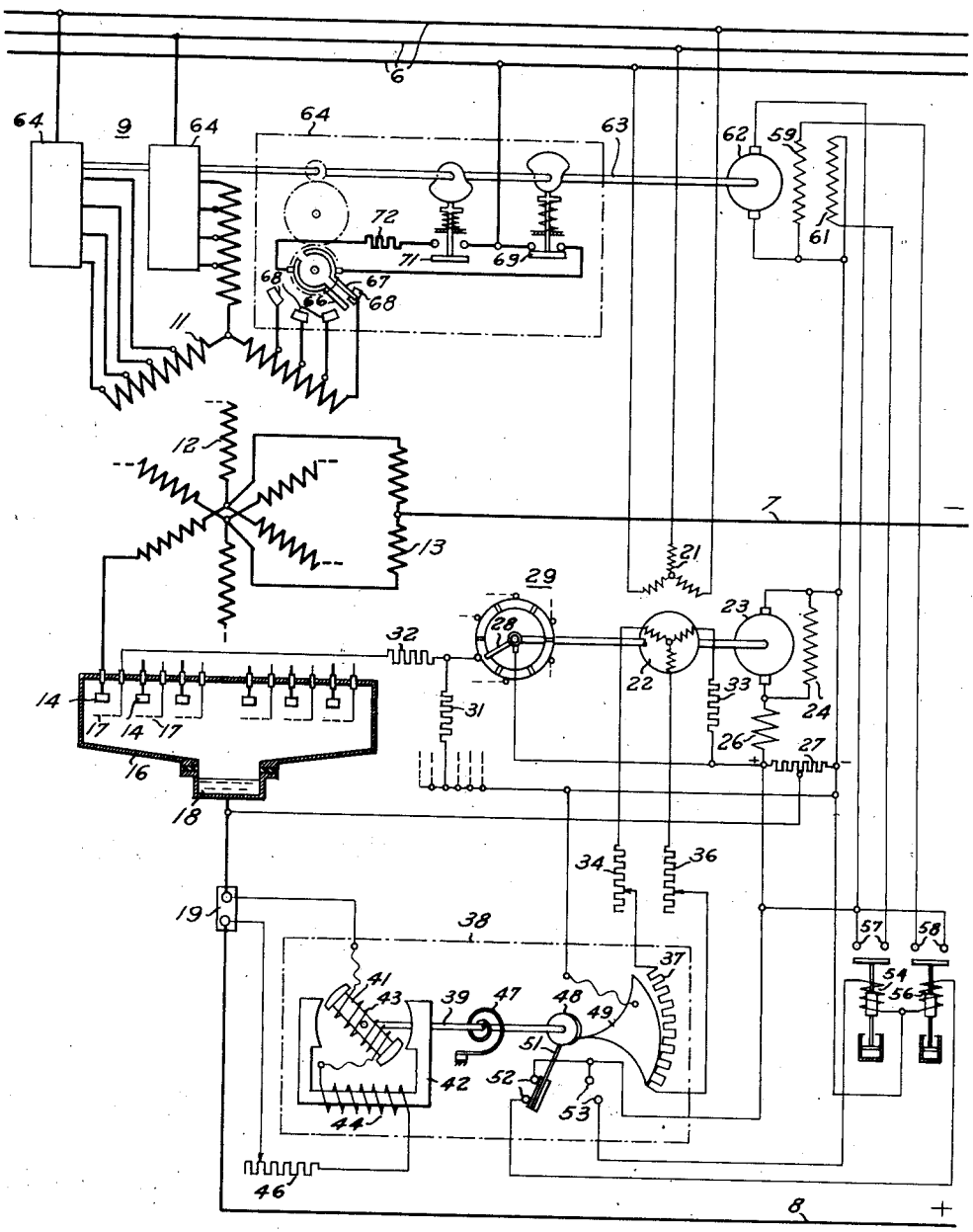

Sept. 14, 1937.　　　　　E. KERN　　　　　2,093,197
ELECTRON DISCHARGE DEVICE REGULATING SYSTEM
Filed May 27, 1933　　　2 Sheets-Sheet 1

Inventor
E. Kern
by G. P. Erbein
Attorney

Patented Sept. 14, 1937

2,093,197

UNITED STATES PATENT OFFICE 2,093,197

ELECTRON DISCHARGE DEVICE REGULATING SYSTEM

Erwin Kern, Ennetbaden, Switzerland, assignor to Aktiengesellschaft Brown Boveri & Cie., Baden, Switzerland, a joint-stock company of Switzerland Application May 27, 1933, Serial No. 673,176
In Germany June 4, 1932

20 Claims. (Cl. 175—363)

This invention relates to improvements in regulating systems and more particularly to means for regulating the output of a current converting system employing one or more electron discharge devices in which the flow of current is controlled by discharge controlling means.

It is well known to utilize one or more electron discharge devices in combination with suitable transformers to constitute an electric current converting system which may be a current rectifying, inverting, frequency changing, or direct current voltage converting system. It is frequently desired to regulate the output of such system to maintain the current or the voltage thereof at a constant value or at values varying in accordance with predetermined conditions. Such a regulation may be obtained by providing a transformer in the system with suitable taps and by suitably varying the connections of such taps. Such method of control permits only a step-wise regulation of the flow of current and, if a small number of taps is used, the current or the voltage may vary from the desired value within comparatively wide limits whereas, if a large number of taps is used, the tap changing means will generally be required to operate frequently with the result that such means are subject to excessive wear. Another method of regulation but giving a gradual rather than step-wise control consists in controlling the discharge within the device or devices by mechanical, electrostatic or electromagnetic means. The action of such means, however, results in a decrease of the power factor of the alternating current flowing through part of the converting system, so that such means may be used to advantage only over a limited range to limit the reduction of the power factor to a small amount. By employing the discharge control means for a gradual regulation over a limited range and by employing, in addition, tap changing or other circuit controlling means to give a step-wise regulation, the regulation may be extended over any desired range without producing the disadvantages of either method of regulation when used alone.

It is therefore among the objects of the present invention to provide a regulating system for an electric current converting system employing an electron discharge device by which the flow of current through the converting system may be cooperatively regulated by step-by-step regulating means and by gradually acting regulating means.

Another object of the present invention is to provide a regulating system for an electric current converting system employing an electron discharge device by which the flow of current through the converting system may be cooperatively regulated by circuit controlling means and discharge controlling means.

Another object of the present invention is to provide a regulating system for a current converting system employing an electron discharge device by which the flow of current through the converting system may be adjusted step-wise by tap changing means associated with a transformer and gradually regulated between steps by arc controlling means associated with the device.

Another object of the present invention is to provide a regulating system for a current converting system employing an electron discharge device by which the flow of current through the converting system may be automatically gradually regulated by means which control the discharge within the device and which also cause operation of a tap changer to change the range of action of such discharge controlling means.

Figure 2:
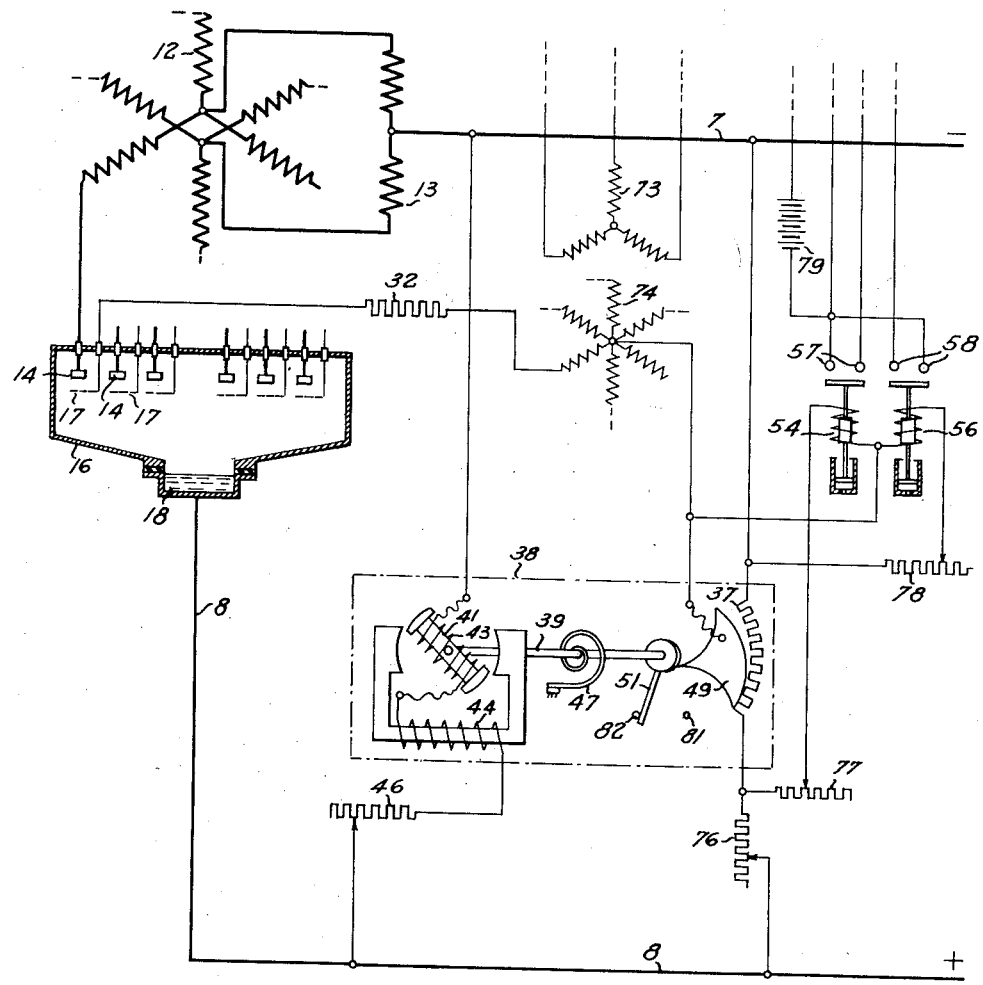

Objects and advantages, other than those above set forth, will be apparent from the following description when read in connection with the accompanying drawings, in which:

Fig. 1 diagrammatically illustrates one embodiment of the present invention applied to the control of a current converting system operable for alternating current rectification or direct current inversion in response to the flow of current therethrough; and Fig. 2 diagrammatically illustrates a portion of a modified embodiment of the present invention in which the current converting system is controlled in response to the value of direct current voltage thereof and differing further from the embodiment illustrated in Fig. 1 in the method of energization of the control electrodes of the discharge device employed in the system.

Referring more particularly to the drawings by characters of reference, reference numeral 6 designates an electric line which may be an alternating current line of any desired number of phases and operating at any desired voltage and frequency. Line 6 is herein represented as a three phase line and, in order to simplify explanation of the operation of the system described hereinafter, it is assumed that the voltage of line 6 is maintained at a constant value although it will be understood that the operation will not be materially different if the voltage of line 6 is variable. It is assumed that the system is to convert current between line 6 and a direct current line 7, 8. Line 6 is connected over a tap changer generally designated by 9 with the primary winding 11 of a transformer having a secondary winding 12. Winding 11 is provided with suitable taps for regulating the voltage thereof and winding 12 is preferably of the six phase type comprising a plurality of phase portions connected to form two neutral points connected with conductor 7 over an interphase transformer 13. The phase portions of winding 12 are severally connected with the anodes 14 of an electron discharge device 16, the operation of each of the anodes being controlled by one of a plurality of control electrodes 17. Device 16 is provided with a cathode 18 connected with conductor 8 over a shunt 19, the purpose of which will appear hereinafter.

In the embodiment illustrated in Fig. 1, line 6 supplies current to the armature or stator 21 of a control synchronous motor having a field or rotor 22 provided with a plurality of windings. Rotor 22 drives the armature 23 of a direct current generator having a shunt field winding 24 and which, if so desired, may be provided with a series field winding 26 in the output circuit thereof. Such generator is utilized as a source of control currents for control electrodes 17 and, for this purpose, the output terminals of such generator are connected with a voltage divider 27 having a tap intermediate the ends thereof connected with cathode 18. The positive terminal of voltage divider 27 is connected with the brush 28 of a distributor 29, such brush being driven by rotor 22. The negative terminal of voltage divider 27 is connected with control electrodes 17 over resistances such as 31 and 32 while the segments of distributor 29 are severally connected with control electrodes 17 over resistances such as 32. One winding of rotor 22 is connected with the positive terminal of voltage divider 27 through a suitable resistance 33, the current flowing through such winding also flowing through two other windings of rotor 22, rheostats 34 and 36 and the resistance 37 of a regulator generally designated by 38.

Regulator 38 is provided with spindle 39 carrying armature 41 movable between the pole faces of a field core 42. Armature 41 is provided with winding 43 and core 42 is provided with a winding 44, such windings being connected in series in circuit with an adjusting rheostat 46. In the embodiment illustrated in Fig. 1, such circuit is connected to shunt 19 to render regulator 38 responsive to the value of the current flowing through device 16. The torque imparted to spindle 39 by armature 41 is opposed by a spring 47 or by a combination of springs having any desired torque characteristic. Spindle 39 carries a hub 48 which acts as fulcrum for a sector 49 constituting a movable tap for resistance 37 and connected with the negative terminal of voltage divider 27. Sector 49 may move directly in contact with resistance 47 or may be connected therewith over a plurality of electrically insulated contacts constituting an arcuate contact path for the sector. Spindle 39 is provided with a contact arm 51 to bridge contacts 52 or 53 when the regulator is in the one or in another extreme position. Contacts 52 control the energization of the coil of a relay 56 from voltage divider 27 while contacts 53 energize the coil of a second relay 54 from such voltage divider. Such relays are provided with time delay devices to permit delayed closure of the contacts 57 and 58 thereof to energize field windings 59 and 61 of a direct current motor having armature 62 and thereby cause such motor to rotate in the one or in the other direction.

Motor 62 drives the shaft 63 of tap changer 9 to operate a plurality of operating mechanisms 64 thereof of which only one is represented in detail to permit comprehension of the operation thereof. Each mechanism 64 is provided with a pair of brushes 66 and 67 operable to come in contacting engagement with a plurality of contacts 68 connected with the taps of a portion of winding 11. Brush 66 is connected with line 6 through a resistance 72 and a circuit breaker 71, while brush 67 is connected with line 6 through a second circuit breaker 69. Circuit breakers 69 and 71 are operated by shaft 63. Assuming that brush 67 is in engagement with a contact 68, to change taps on winding 11, shaft 63 is rotated and operates brushes 66 and 67 to engage with two adjacent contacts 68; line 6 is then connected with one contact 68 over brush 67 and circuit breaker 69 and with another contact 68 over brush 66, circuit breaker 71 and resistance 72. Circuit breaker 69 is then opened by shaft 63 which thereafter moves brush 67 out of engagement with the associated contact and in engagement with the contact already engaged with brush 66. Circuit breaker 71 is then opened by shaft 63 and brush 66 is moved out of engagement with the associated contact thereby completing the tap changing operation. Suitable limit switches (not shown) may be provided for deenergizing field 59 or 61 and thereby stop armature 62 when the tap changer reaches the one or the other extreme position thereof.

In operation, the system being connected as shown and line 6 being energized, anodes 14 receive alternating current voltages therefrom through transformer 11, 12 which voltages sequentially render such anodes positive by a certain amount with respect to cathode 18. The rotor of motor 21, 22 then rotates at synchronous speed and drives armature 23 which excites itself by means of shunt field 24. Control electrodes 17 are generally maintained negative with respect to the potential of cathode 18 by means of voltage divider 27 connected with the control electrodes through resistances 31 and 32. Such control electrodes are sequentially and periodically rendered positive with respect to cathode 18 by means of voltage divider 27 through brush 28, distributor 29 and resistances 32. The time of the voltage cycle of line 6 at which each control electrode is positively energized is determined by the relative position of rotor 22 with respect to the rotating field produced by winding 21. When the system is put in operation, regulator 38 is in the position shown so that the entire resistance 37 is inserted in series with rheostat 34 and rheostats 34 and 36 are then adjusted in such a manner that the control electrodes 17 are positively energized at the earliest moment of the voltage cycle of line 6 at which the associated anodes 14 may carry current, such adjustment being however different when it is desired to transfer energy from line 6 to line 7, 8 and when it is desired to transfer energy from line 7, 8 to line 6 as is well known in the art. Due to the action of the control electrodes, current then flows sequentially through the several anodes 14, such currents combining at cathode 18 to form a direct current flowing through shunt 19. Rheostat 46 is so adjusted that, if such direct current exceeds the desired value, the current flowing through windings 43 and 44 will cause armature 41 to rotate spindle 49 against the action of spring 47, thereby changing the point of contact of sector 49 on resistance 37. The distribution of the current through the several windings of rotor 22 is thereby altered and causes such rotor to lag behind the rotating field induced by winding 21. The time of energization of each control electrode is thereby retarded with respect to the voltage cycle of line 6 thereby causing the flow of current through device 16 to be reduced. Spindle 39 continues to rotate and the time of energization of control electrodes 17 continues to be retarded until the current flowing through shunt 19 is reduced to the desired value, at which time spindle 39 stops and control electrode 17 continues to be energized at times corresponding to the new position of spindle 39. The value of current thus maintained may be set as desired by the adjustment of rheostat 46. Regulator 38 thus gives a gradual control of the flow of current and such regulator is sufficient alone provided that the flow of current tends only to depart from the desired value by a predetermined amount.

If the current tends to rise to a slightly greater extent than can be corrected by regulator 38 alone, spindle 39 reaches an extreme position thereof and contact arm 51 closes contacts 53. The coil of relay 54 receives current from voltage divider 27 over contacts 53 and, after a predetermined time delay, relay 54 closes contacts 57. Field winding 61 is then energized from voltage divider 27 over contacts 57 and, as armature 62 was already energized from voltage divider 27, such armature rotates shaft 53 to move tap changer 9 to the next lower step if the current converter is operable as an alternating current rectifying system, and to the next higher step if the current converting system is operable as a direct current inverting system. When such tap changing operation is completed, the current flowing through shunt 19 is reduced below the desired value and regulator 38 returns to a position intermediate the two extreme positions thereof to continue to maintain such current at the desired value. Contacts 53 are then opened and relay 54 opens contacts 57, thereby deenergizing field winding 61 and shaft 63 of tap changer then stops. If the current tends to increase still further contacts 53 will remain closed until tap changer 9 has operated over a sufficient number of steps to reduce the flow of current to a value which can then be regulated to exactly the desired value by regulator 38. If the current decreases below the desired value to an extent greater than can be corrected by regulator 38 alone, spindle 39 will return to the position shown thereby closing contacts 52 so that the coil of relay 56 is energized and such relay closes contacts 58 to energize field winding 59. Armature 62 then drives shaft 63 of tap changer 9 in a direction opposite to that considered above, thereby causing tap changer 9 to adjust the taps on winding 11 to increase the flow of current. When the flow of current is returned to a value close to the desired value by the action of the tap changer, regulator 38 again brings such current at exactly the desired value.

In the embodiment illustrated in Fig. 2, regulator 38 is controlled in response to the value of the voltage of line 7, 8 and the circuit of the windings 43 and 44 is thereby connected between conductor 7 and conductor 8. In the present embodiment, it is assumed that control electrodes 17 are energized by means of a control transformer having a primary winding 73 energized from line 6 and a star connected secondary winding 74 having a plurality of phase portions severally connected with control electrodes 17 over resistances 32. The neutral point of winding 74 is connected with sector 49 of regulator 38 and resistance 37 of regulator 38 is energized from line 7, 8 through a rheostat 76. Resistance 37 with rheostat 76 then constitute a voltage divider of which sector 49 is the tap and superimposes, on the voltages of winding 74, a direct current voltage which is a variable portion of the voltage of line 7, 8. In the present embodiment, contacts 52 and 53 are omitted and the coils of relays 54 and 56 receive voltages equal to the voltage drops in the two portions of resistance 37 respectively. The distribution of current between resistance 37 and the windings of the relays is adjusted by means of rheostats 77 and 78. As a source of control direct current is no longer available for energizing the winding armature 62 and field windings 59 and 61, such windings are preferably energized by means of a battery 79 connected therewith in a manner similar to the manner of connection of voltage divider in the embodiment of Fig. 1.

In operation, the control electrodes 17 receive, from winding 74 and from rheostat 76 and resistance 37, combined direct current and alternating current voltages which sequentially and periodically render such control electrodes positive with respect to cathode 18, thereby permitting the associated anodes to carry current. The operation of device 16 is then similar to that described with regard to the embodiment illustrated in Fig. 1. In the present embodiment, if the voltage of line 7, 8 increases beyond the desired value by a small amount, armature 41 rotates spindle 39 against the action of spring 47 thereby causing a greater amount of resistance to be inserted between winding 74 and conductor 8 and a lesser amount to be inserted between winding 74 and conductor 7. The voltage of the neutral point of winding 74 with respect to cathode 18, which is equal to the voltage drop in the resistance in circuit between sector 49 and conductor 8, is thereby increased with the result that the flow of current through device 16 is decreased as is well known in the art. Spindle 39 continues to move sector 49 until the voltage of line 7, 8 is returned to the desired value at which time spindle 39 stops. If the voltage of line 7, 8 tends to increase to a greater extent than can be compensated by regulator 38, spindle 39 will reach an extreme position thereof, in which position arm 51 engages with a suitable stop 81. The voltage impressed on the coil of relay 54 is then the entire voltage drop in resistance 37, which value is sufficient to cause relay 54 to attract the armature thereof and close contacts 57. Such operation of relay 54 results in the operation of tap changer 9 as described with respect to the embodiment of Fig. 1. After completion of the operation of the tap changer 9, regulator 38 returns to an intermediate position thereof to bring the value of the voltage of line 7, 8 to exactly the desired value with the result that the voltage received by the coil of relay 54 from a portion of resistance 37 becomes insufficient to maintain the armature 54 attracted and such relay opens contacts 57 thereby causing tap changer 9 to stop. If the voltage of line 7, 8 decreases below the desired value, spring 47 returns armature 41 towards the position shown until the action of regulator 38 returns such voltage to the desired value. If such voltage tends to decrease to a greater extent than can be compensated by the action of regulator 38, spindle 39 will return to the position shown against stop 82, thereby impressing on the coil of relay 56 the entire voltage drop of resistance 37. Relay 56 then closes contacts 58 thereby causing tap changer 9 to operate to return the voltage of line 7, 8 to approximately the desired value. Regulator 38 then brings such voltage to exactly the desired value corresponding to the adjustment of rheostat 46.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a current converting system, an electric current line, electron discharge means connected with said line, a second electric current line connected with said discharge means, discharge controlling means associated with said discharge means for gradually controlling the flow of current therethrough, and means controlled by the second said means for stepwise controlling the magnitude of said flow of current.

2. In a current converting system, an alternating current line, a transformer having connections with said line, an electron discharge device connected with said transformer, an electric current line connected with said discharge device, means for controlling the magnitude of the flow of current through said discharge device, and switch means controlled by the first said means for varying the connections of said transformer with said alternating current line.

3. In a current converting system, an alternating current line, a transformer having connections with said line, an electron discharge device connected with said transformer, an electric current line connected with said discharge device, means for controlling the magnitude of the flow of current through said discharge device, switch means for selectively establishing a plurality of connections of said transformer with said alternating current line, and means responsive to an electrical condition of one of said lines for controlling the operation of the first and second said means.

4. In a current converting system, an alternating current line, a transformer having connections with said line, an electron discharge device connected with said transformer, an electric current line connected with said discharge device, means for controlling the magnitude of current flow through said discharge device within predetermined limits, switch means for selectively establishing a plurality of connections of said transformer with said alternating current line to thereby vary the magnitude of current flow through said device beyond said predetermined limits, and means responsive to an electrical condition of one of said lines coordinately controlling the operation of the first and second said means.

5. In a current converting system, an alternating current line, a transformer having connections with said line, an electron discharge device connected with said transformer, an electric current line connected with said discharge device, means for controlling the magnitude of current flow through said discharge device, switch means for varying the connections of said transformer with said alternating current line, and means responsive to the voltage of one of said lines for coordinately controlling the operation of the first and second said means.

6. In a current converting system, an alternating current line, a transformer having connections with said line, an electron discharge device connected with said transformer, an electric current line connected with said discharge device, means for controlling the magnitude of current flow through said discharge device, switch means for selectively establishing a plurality of connections of said transformer with said alternating current line, and means responsive to the flow of current between said lines for coordinately controlling the operation of the first and second said means.

7. In a current converting system, an alternating current line, a transformer connected with said line, an electron discharge device connected with said transformer, an electric current line connected with said discharge device, means for controlling the discharge within said discharge device, switch means for controlling the connection of said transformer with said alternating current line, means for gradually controlling the first said means to regulate the flow of current through said device to a predetermined extent, and means controlled by the third said means for controlling the second said means to stepwise regulate the flow of current through said device to an extent greater than the mentioned predetermined extent.

8. In a current converting system, an alternating current line, a transformer connected with said line, an electron discharge device connected with said transformer, an electric current line connected with said discharge device, means for controlling the discharge within said discharge device, switch means for controlling the connection of said transformer with said alternating current line, means movable to and from a plurality of limit positions and operable at positions intermediate such said limit positions to gradually control the first said means, and means controlled by the third said means when moved to either of its said limit positions to control the second said means.

9. In a current converting system, an alternating current line, a transformer having connections with said line, an electron discharge device having anodes connected with said transformer and having control electrodes associated with said anodes and a cathode, an electric current line connected with said discharge device, a source of control potentials, means for controlling the connection of said source with the control electrodes of said discharge device, switch means for varying the connection of said transformer with the first said line, means for gradually controlling the first said means to regulate the flow of current through said device to a predetermined extent, and means operable by the third said means for controlling the second said means to stepwise regulate the flow of current through said device to an extent greater than the mentioned predetermined extent.

10. In a current converting system, an alternating current line, a transformer connected with said line, an electron discharge device having anodes connected with said transformer and having control electrodes associated with said anodes and a cathode, an electric current line connected with said discharge device, a source of control potentials, means for controlling the connection of said source with the control electrodes of said discharge device, switch means controlling the connection of said transformer with the first said line, means for gradually controlling the first said means, and means controlled by the third said means in the one or in the other limit position thereof to control the second said means.

11. The method of controlling the output of a current converting system employing an electron discharge device which consists in alternately gradually controlling the discharge within said device and in stepwise controlling the connections of the circuits of the converting system in dependence upon changes in operating conditions of the system.

12. The method of controlling the output of a current converting system employing an electron discharge device which consists in alternately gradually controlling the discharge within said device to gradually control the flow of current through the system within predetermined limits and in stepwise controlling the connections of the circuits of the converting system to stepwise control the flow of current beyond the mentioned predetermined limits in dependence upon changes in operating conditions of the system.

13. In combination with an electron discharge device, an electric current input circuit, inductive means having connections with said circuit and with said device for supplying current to the latter, an output circuit connected with said device to be supplied with current therefrom, means for controlling the magnitude of the flow of current through said device to said output circuit, and means controlled by the second said means for varying the said connections of the first said means with the said supply circuit.

14. The combination with an electric current converting system comprising an alternating current supply circuit, an electric current load circuit, and means interconnecting said circuits comprising an electron discharge device having an anode and a cathode constituting spaced electrodes for the flow of current therebetween, of means for regulating said flow of current comprising means operable to vary the connections of the first said circuit with said device, means operable to vary the conductivity of said device, and means variably operable, responsive to variations in the operating conditions of said system, to control the said operations of the third and fourth said means.

15. The combination with an alternating current supply circuit, an electric current load circuit, and means interconnecting said circuits comprising an electron discharge device having an anode and a cathode constituting spaced electrodes for the flow of current therebetween, of means for regulating the said flow of current comprising means operable to vary the connection of the first said circuit with said device, means operable to vary the conductivity of said device, and means operable, responsive to an electrical condition of one of said circuits, to control the said operations of the third and fourth said means.

16. The combination with an alternating current supply circuit, an electric current load circuit, and means interconnecting said circuits comprising an electron discharge device having an anode and a cathode constituting spaced electrodes for the flow of current therebetween, of means for regulating the said flow of current comprising means operable to vary the connection of the first said circuit with said device, means operable to vary the conductivity of said device, and means operable, responsive to the voltage of one of said circuits, to control the said operations of the third and fourth said means.

17. The combination with an electric current supply circuit, an electric current load circuit, and means comprising an electron discharge device interconnecting said circuits and having spaced electrodes for the flow of current therebetween, of means for regulating the voltage of the second said circuit comprising means for varying the conductivity of said device, means for varying the connections of the first said circuit with said device, and means variably movable, responsive to and in dependence on variations in the voltage of the second said circuit, to and from a plurality of intermediate positions to control thereat the third said means and movable to a plurality of limit positions to control thereat the fourth said means.

18. In a current converting system, an electric current supply line, electron discharge means connected with said supply line, an electric current output line connected with said discharge means, means for controlling the conductivity of said discharge means operable to gradually control the magnitude of the voltage of said output line, and means controlled by said conductivity controlling means operable to stepwise control the magnitude of the voltage of said output line.

19. The combination with an electric current supply circuit, an electric current load circuit, and means comprising an electron discharge device interconnecting said circuits and having spaced electrodes for the flow of current therebetween, of means for regulating the voltage of the second said circuit comprising means for varying the conductivity of said device, means for varying the connections of the first said circuit with said device, and means variably movable, responsive to and in dependence on variations in the magnitude of the current of the second said circuit, to and from a plurality of intermediate positions to control thereat the third said means and movable to a plurality of limit positions to control thereat the fourth said means.

20. In combination, an electric current supply line, an electric current output line, one of said lines being a direct current line, an electric translating system including a transformer and an electric valve having an anode with an associated control electrode and a cathode connected with said lines for controlling the flow of current therebetween, a tap changer for varying the connections of said transformer to control the magnitude of the voltage of said output line in steps of predetermined magnitudes, an auxiliary transformer for impressing an alternating voltage component between said control electrodes and said cathode similar to a voltage of the first said transformer, a voltage divider connected across said direct current line, a movable tap of said voltage divider being connected with said transformer to superpose on said alternating voltage component a gradually variable direct voltage component, and means for coordinately moving said tap and said tap changer.

ERWIN KERN.